April 14, 1959   F. K. DEARBORN   2,881,663
OPTICAL FILTERS
Filed Nov. 8, 1956
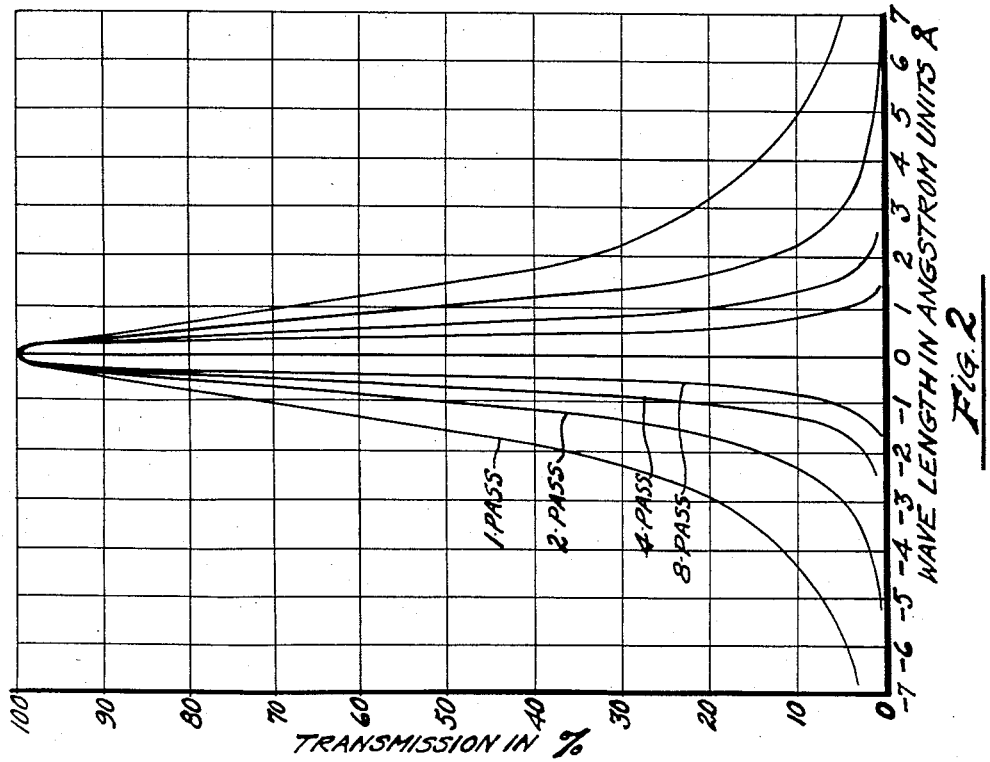
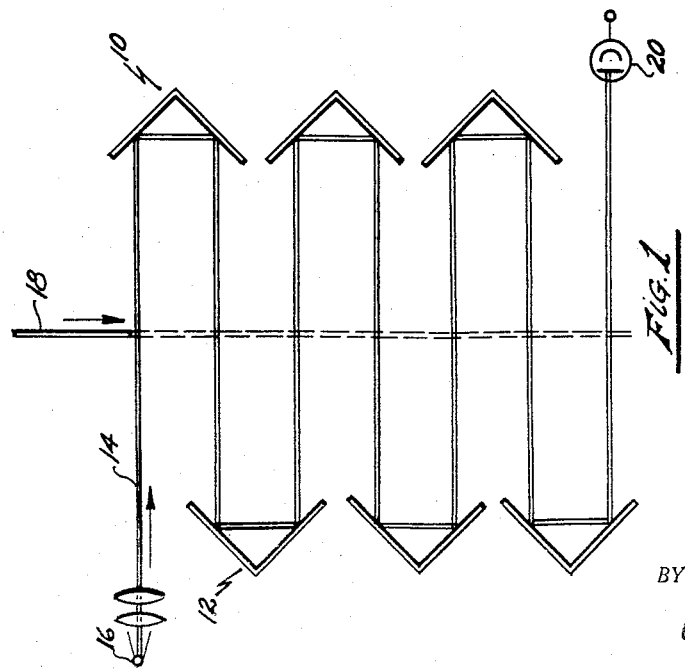
INVENTOR.
FRANK K. DEARBORN
BY
ATTORNEYS

United States Patent Office

2,881,663
Patented Apr. 14, 1959

2,881,663

OPTICAL FILTERS

Frank K. Dearborn, Lexington, Mass.

Application November 8, 1956, Serial No. 621,187

2 Claims. (Cl. 88—106)

(Granted under Title 35, U.S. Code (1952), sec. 266)

The invention described herein may be manufactured and used by or for the United States Government for governmental purposes without payment to me of any royalty thereon.

The present invention relates generally to improvements in optical filters and, as illustrated herein, relates more particularly to improvements in stepped variable bandwidth optical filters.

One object of the present invention is to provide an optical filter which is variable in a series of precise steps while accurately maintaining an exact fixed center transmission wavelength. To this end, and as illustrated, one feature of the invention resides in a system of reflectors so related to each other that a beam of light may be intercepted by an optical filter one or more times as the beam is reflected from one set of reflectors to the other.

The measurement of radiation of various wavelengths in atmospheric visibility studies may be made more accurately and more conveniently by use of the present invention. By the selection of optical filters having the desired optical characteristics, it is possible to measure within close limits radiation both within and beyond the limits of the visible spectrum. By passing the beam of light repeatedly through the filter having the required optical characteristics, it is possible to reduce the bandwidth of the light beam while at the same time maintaining an exact center transmission wavelength.

Other objects of the invention are to improve generally upon the construction and operation of selective radiation transmitting devices.

With the above and other objects and features in view, the invention will now be described with particular reference to the accompanying drawings which disclose a preferred embodiment thereof, and in which:

Fig. 1 is a schematic showing of a device constructed in accordance with the present invention; and Fig. 2 illustrates generally the transmission characteristics of a filter of arbitrary center wavelength.

The present invention is illustrated in Fig. 1 of the drawings as being provided with two lines or sets of reflectors 10 and 12 which are preferably inclosed in a light-tight box (not shown). The lines or sets of reflectors 10 and 12 are arranged in pairs, and one reflector of each pair is located at right angles to the other reflector of the pair. As shown, a beam of light 14 emanating from a suitable source 16 is incident upon one of the mirrors 10 from which it is reflected to the other mirror of the pair 10 and thence to one of the mirrors 12 in the other line of reflectors. The beam 14 is then reflected to the other mirror of a pair 12 and thence back to a mirror in the first mentioned line of reflectors 10. For convenience and to avoid difficulty due to refraction, the reflected light paths of the beam 14 between the lines of pairs of reflectors 10 and 12 are parallel and are located at substantially right angles to the plane surfaces of an optical filter 18.

The optical filter 18 may be formed in any suitable light transmitting material such as glass, plastic, gelatin or the like which may be treated as by staining. This provides a filter having known transmission characteristics such as a peak or center wavelength and a known transmission at said peak or center wavelength. The optical filter 18 is relatively long and narrow and is of a length sufficient to intercept all of the passes of the light beam 14 reflected from one line of reflectors 10 to the other line of reflectors 12. The filter 18 may be arranged for automatic movement into successive intercepting positions so that the number of passes of the light beam 14 may be varied as necessary. Preferably, the filter should intercept at least two passes and may intercept up to eight or more passes. The particular number is dependent upon the intensity of the original light beam and upon the transmission characteristics of the filter 18.

Filters for use in practicing the present invention may be designed for peak or center wave transmission in the visible spectrum as well as in the infrared and ultraviolet regions of the spectrum. The transmission characteristics of an optical filter of arbitrary center wavelength are illustrated clearly in Fig. 2. The center wavelength may be in the visible spectrum or, as pointed out above, it may be in either the infrared or ultraviolet regions of the spectrum. Filters of known peak or center wavelength transmission are readily available for use in any region of the spectrum. In the visible spectrum, blue filters generally have transmission peaks between 3500 and 4500 angstrom units with relatively low transmission on either side of the selected peak. Green filters for example may have a peak wavelength of about 5400 angstrom units, and the wave bandwidth varies depending upon the quality of the filter. A very high quality of fitler may have a bandwidth in the order of two or three angstrom units, whereas filters of inferior quality may have a bandwidth of 50 or more angstrom units. There are some red filters which are reasonably pure in color, or in other words are of reasonably high quality, particularly in the high wavelength end of the spectrum, and high transmission may continue well into the infrared region, but many red filters have yellow transmission characteristics in the visible spectrum which of course is a disadvantage. Filters having peak wavelengths in either the ultraviolet or infrared regions of the spectrum are available. For example, a pair of crossed sheet polarizers formed from stretched polyvinyl alcohol stained with iodine is substantially opaque to visible light but has a high transmission in the infrared region.

As previously stated, the filter 18 may be moved step-by-step by suitable power operated mechanism (not shown), or it may be moved manually to intercept successive passes of the beam 14 from one of the reflectors to the other. Since the transmission at the center wavelength of the filter 18 is in the order of 100%, and as shown in Fig. 2, the transmission on either side of the center or peak wavelength is substantially less than 100%, such light or radiation at either side of the peak wavelength will be substantially absorbed to an extent where it will have no appreciable effect on a photosensitive tube. The intensity of the center wavelength bandwidth of the beam 14 will, however, except for small losses due to surface reflections of the filter 18, be substantially undiminished, and the intensity of the center band wavelength of the incident radiation can be calculated since the absorption characteristics and reflection losses of the filter 18 are known or may be readily calculated.

Referring now more particularly to Fig. 2, it is to be noted that the four transmission curves of radiation of arbitrary center wavelength are shown. The bandwidth may, as illustrated, be of the order of two angstrom units, or it may be substantially wider depending upon the characteristics of the particular filter employed. By causing the reflected beam to pass repeatedly through the filter 18, the transmission of the radiation on both sides is reduced substantially to zero. For example, wavelengths approximately four angstrom units to one side or the other of the center of peak wavelength are only transmitted 10% upon one pass through the filter 18 and on two passes transmission are reduced to substantially 1%. Radiation two angstrom units to one side or the other of the peak or center wavelength is 35% transmitted after one pass through the filter 18, and after two passes transmission is reduced to approximately 12% and after four passes to approximately 1.5% transmission. Radiation having wavelengths closely approximating the peak or center wavelength of the filter is transmitted without substantial reduction in intensity while the peak or center wavelength of the band remains constant. Thus radiation striking the photosensitive tube 20 represents practically only the intensity of that narrow bandwidth. The intensity on radiation of either side of said band is of such a low order that it will have no appreciable effect on the total intensity reaching the tube 20. Thus it is apparent that the original intensity of the radiation of the wavelengh which it was desired to study or determine may be readily calculated.

Having thus described my invention, what I claim as new and desire to secure by Letters Patent of the United States is:

1. A filter system for reducing the bandwidth of a light source in order to measure the intensity of said source in a preselected narrow band, said filter system comprising a plurality of sets of reflectors located at substantially right angles to each other, said reflectors being arranged in pairs in parallel lines to reflect a beam of light from one of said lines of reflectors to the other of said lines along spaced non-intersecting paths, and a filter positioned between said lines and arranged to be moved step-by-step to intercept successive passes of said beam as it is reflected from one line of reflectors to the other, said filter having a narrow, preselected center wavelength bandwidth whereby each pass through said filter reduces the bandwidth of said light on both sides of said center wavelength.

2. A system as defined in claim 1 wherein said non-intersecting paths are parallel and wherein the reflected beams passing through said filter intersect the latter at substantially right angles.

References Cited in the file of this patent

UNITED STATES PATENTS

| | | |
|---|---|---|
| 1,848,874 | Fitzgerald | Mar. 8, 1932 |
| 2,729,143 | White | Jan. 3, 1956 |